United States Patent
Elliott et al.

[11] Patent Number: 5,809,015
[45] Date of Patent: Sep. 15, 1998

[54] TDMA COMMUNICATION SYSTEM FOR MAXIMIZING ADJACENT PAIRS OF SLOTS IN A TDMA FRAME

[75] Inventors: Patrick W. Elliott, Bristol, England; Nikolaou T. Kanaropoulos, Thessaloniki, Greece

[73] Assignee: U.S. Philips Corporation, New York, N.Y.

[21] Appl. No.: 358,440

[22] Filed: Dec. 19, 1994

[30] Foreign Application Priority Data

Jan. 7, 1994 [GB] United Kingdom ................ 9400253.2

[51] Int. Cl.[6] .................................................. H04B 7/212
[52] U.S. Cl. ............................................ 370/280; 370/337
[58] Field of Search .................................. 370/24, 29, 50, 370/84, 95.1, 95.3, 94.2, 276, 280, 294, 328, 321, 326, 330, 337, 347, 442, 498, 332, 333, 252; 455/34.1, 34.2, 62, 67.1, 67.3, 54.1, 33.2

[56] References Cited

U.S. PATENT DOCUMENTS

| | | | |
|---|---|---|---|
| 5,117,423 | 5/1992 | Shepherd et al. ........................ | 370/95.1 |
| 5,200,956 | 4/1993 | Pudney et al. .......................... | 370/95.3 |
| 5,258,981 | 11/1993 | Davey et al. ........................... | 370/95.1 |
| 5,278,835 | 1/1994 | Ito et al. ................................. | 370/95.1 |

OTHER PUBLICATIONS

ETS 300 175–1 Part 1 "Radio Equipment and Systems (RES); Digital European Cordless Telecommunications (DECT) Common Interface", Part 1: Overview, Section 6, Oct. 1992, pp. 24–25.

ETS 300 175–1 Part 1, Radio Equipment and Systems (RES); Digital European Cordless Telecommunications (DECT) Common Interface, Part 2: Physical Layer, Section 4.2.1, Oct. 1992, pp. 15–16.

Primary Examiner—Chau Nguyen
Attorney, Agent, or Firm—Arthur G. Schaier

[57] ABSTRACT

A slot selection algorithm for use in a multi-slot TDMA communications system which has provision for transmissions requiring a single time slot or a double time slot. The algorithm requires that whenever possible a transmission requiring a single time slot is allocated to an acceptable, but not necessarily the best, inactive time slot which is located adjacent to an active time slot in a TDMA frame. By so doing the number of inactive time slots available for double time slot transmissions may be increased.

4 Claims, 4 Drawing Sheets

TDMA COMMUNICATION SYSTEM FOR MAXIMIZING ADJACENT PAIRS OF SLOTS IN A TDMA FRAME

FIELD OF THE INVENTION

The present invention relates to slot selection in multi-slot Time Division Multiple Access (TDMA) communication systems, such as the Digital European Cordless Telephone System, DECT, and to a subscriber unit having means for controlling slot selection.

DESCRIPTION OF THE RELATED ART

For convenience of description the present invention will be described in the context of DECT but it is to be understood that the present invention can be applied to other TDMA communication systems having different widths of time slots.

In the DECT system, when a subscriber unit wishes to make a call, it will as a preliminary step scan all the duplex voice channels on all the frequency channels in order to determine the best available or inactive duplex voice channel and select that one. Thereafter it transmits on the selected channel or time slot. This type of channel selection is generally termed dynamic channel selection.

The DECT standard as described in ETS 300 175-1 Part 1: Overview, Section 6 pages 24 and 25, describes the basic technical characteristics of the system as comprising 10 frequency carriers, each having a TDMA multiplex of 24 time slots per frame of which 12 time slots are transmit slots and 12 time slots are receive slots. A basic duplexing is time division duplex (TDD) using two time slots on the same carrier. In applying dynamic channel selection, a subscriber is not constrained in choosing a time slot for a full-slot transmission.

The DECT standard ETS 300 175-2 Part 2: Physical Layer Section 4.2.1. specifies the frame, full-slot and half slot structure. This section also mentions a double slot structure which has a length of two full time slots and specifies that a double slot starts concurrently with an even numbered full slot. Thus when a subscriber unit wants to initiate a transmission requiring a double slot, the dynamic channel selection procedure has to be constrained by having to look for an acceptable double slot commencing with an even numbered full slot. Simulations which have been carried out in respect of mixing different types of services taking advantage of different slot types shows that there is a non-trivial degradation of the Grade of Service (GOS) when the existing double slot selection protocol is adhered to.

An object of the present invention is to improve the Grade of Service when using different slot types.

SUMMARY OF THE INVENTION

According to one aspect of the present invention there is provided a time division multiple access (TDMA) communication system comprising a plurality of subscriber units, each unit comprising radio transceiving means and control means, the control means including means responsive to a request to initiate a call for scanning duplex voice channels comprising complementary time slots in a TDMA frame; means for determining the quality of at least each inactive time slot and forming a channel map, and means for selecting for a full time slot transmission an inactive full time slot of an acceptable quality which is located adjacent to an active full time slot in the frame.

The present invention is based on the recognition of the problem that unconstrained dynamic channel selection based on choosing the best available inactive time slot may reduce the number of possible available double slots. However by modifying the dynamic channel selection algorithm so that the time slot selected for a full time slot call is located adjacent an active full time slot, this will increase the number of double slots and thereby enable an improved GOS to be achieved. This modified dynamic channel selection algorithm may also be applied when assigning half time slot calls vis à vis full time slot call.

According to another aspect of the present invention there is provided a subscriber unit for use in a time division multiple access (TDMA) communication system, comprising radio transceiving means, control means, means for determining the quality of a TDMA physical channel and a channel map store, wherein the control means in response to a call request for a full time slot transmission has means for determining which of the inactive physical channels in the channel map store is of an acceptable quality and means for initiating a transmission in an inactive full time slot channel of an acceptable quality located adjacent a full time slot active channel.

By selecting an odd numbered inactive time slot which is adjacent a full even numbered active time slot or vice versa to form a pseudo-double slot then this will increase the number of possible available double slots.

When implementing the present invention a compromise may be necessary to the normal rule of dynamic channel selection because in order allocate a full time slot call to an inactive TDMA time slot which is adjacent an active TDMA time slot, it may be necessary to choose the second best or third best inactive time slot which in any event is acceptable.

BRIEF DESCRIPTION OF THE INVENTION

The present invention will now be described, by way of example, with reference to the accompanying drawings, wherein:

FIG. 1 illustrates diagrammatically a base station and 2 subscriber units, which may be fixed or portable, in a cordless telephone system, FIG. 2 illustrates the framing structure of a DECT frequency channel, FIG. 3 illustrates an example of various slot structures in a DECT frame, FIG. 4 is a block schematic diagram of a subscriber unit, FIG. 5 is a flow chart of a channel selection algorithm, and FIGS. 6, 7 and 8 are graphs illustrating, respectively, the grades of service (GOS) between applying the normal DECT channel selection algorithm (circles) and the channel selection algorithm (triangles) described with reference to FIG. 5.

DETAILED DESCRIPTION OF THE PREFERRED EMBODIMENTS

Figure 1:
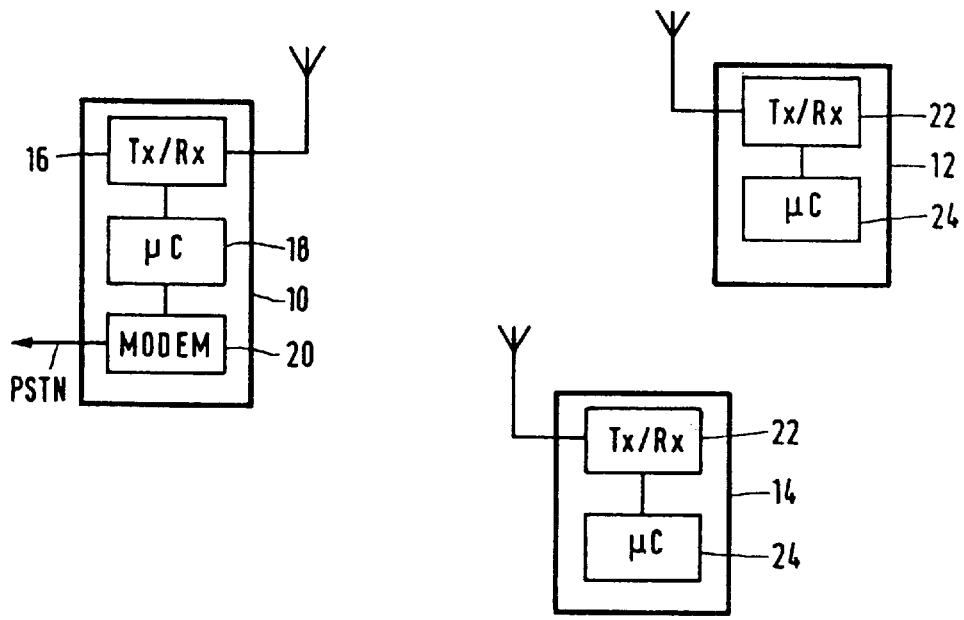

In the drawings the same reference numerals have been used to indicate corresponding features.

FIG. 1 illustrates diagrammatically a cordless telephone system comprising a base station 10 and two subscriber units 12,14. The subscriber unit 12 is a portable unit and the unit 14 comprises a data terminal which is fixedly sited. The base station 10 comprises a transceiver 16 which is controlled by a microcontroller 18. A modem 20 is coupled between the controller 18 and a landline such as the PSTN. Each subscriber unit 12,14 comprises a transceiver 22 which is controlled by a microcontroller 24. A more detailed description of a subscriber unit will be given later with reference to FIG. 4.

As mentioned in the preamble, communication between the base station 10 and a subscriber unit 12 or 14 is in accordance with a TDMA protocol comprising a frequency channel which divided into a succession of time frames F, each frame comprising a plurality of time slots (or physical channels) of which 50% are nominally devoted to forward transmission from the base station and 50% are nominally devoted to reverse transmission. Generally correspondingly numbered forward and reverse time slots (termed duplex voice pair) are allocated to a call.

Figure 2:
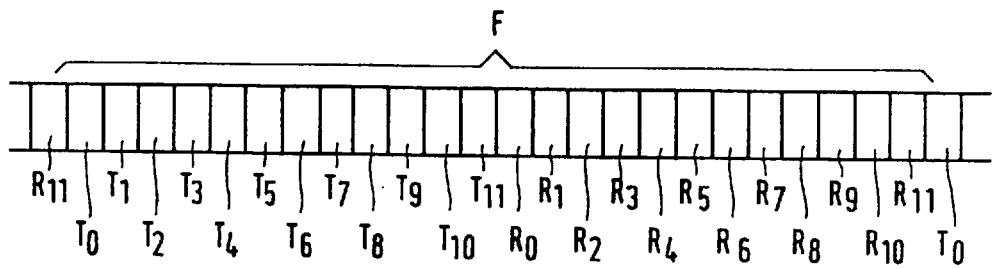
Figure 3:
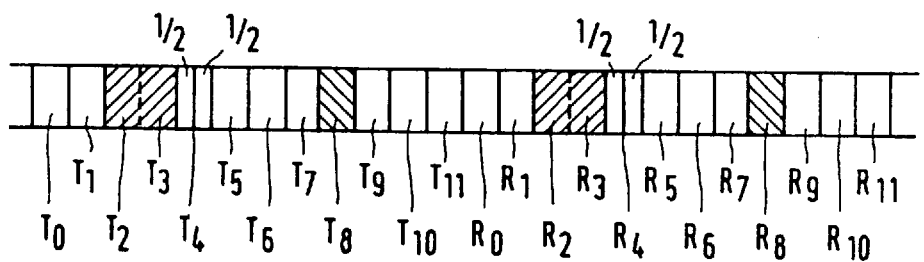

FIG. 2 shows the basic frame structure for DECT which comprises 24 time slots of which the first 12 are referenced $T_0$ to $T_{11}$ and the second 12 are referenced $R_0$ to $R_{11}$. Referring to FIG. 3, for a speech call DECT allocates a full time slot in each direction for example duplex voice pair $T_8,R_8$. The requirements for data vary according to the type of data subscriber unit. For communication with low rate data subscriber units, DECT gives the option of allocating half a time slot in each direction, see for example time slots $T_4,R_4$. Alternatively for communication with high rate data subscriber terminals, DECT has provision for allocating a double time slot in each direction, see for example time slots $T_2,T_3$ and $R_2,R_3$. According to the DECT protocol a double time slot must start with an even numbered time slot, that is 0, 2, 4, 6, 8, or 10.

If full time slot calls are allocated entirely on a dynamic channel allocation basis it is possible that for example six calls are allocated such that there are no double time slots available with the result that the GOS for high rate data services is zero. Looking at FIG. 3 and assuming that the duplex voice channel $T_8,R_8$ has been allocated, if a subscriber unit requiring a full slot determines after scanning the physical channels that the physical channel $T_6$ is the best available channel and that channels $T_9$ and $T_{10}$ are the second and the third best and in any event are acceptable, then under the dynamic channel allocation algorithm, it will grab $T_6,R_6$. However by doing so, it has denied a high rate data subscriber unit of the possibility of a double slot at $(T_6,T_7)(R_6,R_7)$. If the channel allocation algorithm is modified so that an available (or inactive) physical channel must be not only acceptable but also adjacent another already allocated (or active) time slot, the result may be that a larger number of free double slots will be available than would be possible if the best time slot is selected. In the present example, if time slots $T_9,R_9$ are allocated to a full slot call, the distribution of non-allocated (or inactive) time slots which could be assigned as double time slots in conformance with the DECT protocol is not affected.

Figure 4:
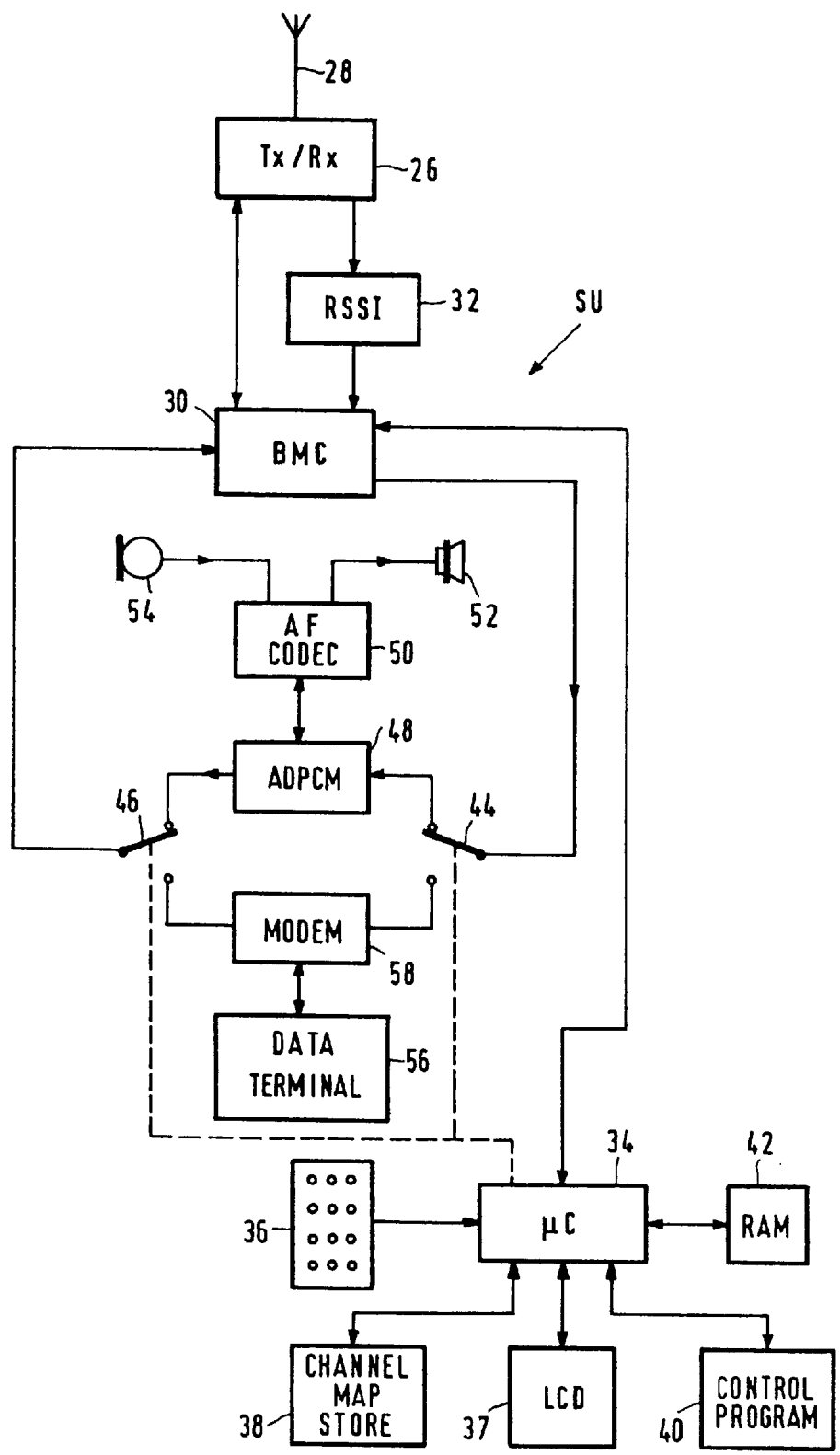

The subscriber unit SU shown in FIG. 4 is capable of transmitting and receiving data and digitised speech as alternatives. A transceiver 26 is connected on the one hand to an antenna 28 and on the other hand to a burst mode controller (BMC) 30 and to means 32 for deriving radio signal strength indications (RSSI) in respect of a received signal. The BMC 30 is controlled by a microcontroller 34 to which is connected a keypad 36, a liquid crystal display (LCD) panel 37, a channel map store 38, a control program 40 and a random access memory (RAM) 42.

Speech or data are alternatively selected by change-over switches 44,46 which are actuated in response to signals generated by the microcontroller 34.

In the position of the switches 44,46 shown, the BMC 30 relays compressed digitised speech signals via the switch 44 to an Adaptive Differential Pulse Code Modulator (ADPCM) 48 which is connected by an audio frequency codec 50 to a loudspeaker 52. A microphone 54 is connected to the codec 50. Digitised coded speech signals from the ADPCM 48 are relayed by the switch 46 to the BMC 30.

In the alternative position of the switches 44,46, a modem which is connected to a data terminal 56 is able to receive data signals from, and send data signals to, the BMC 30. When idle, the microcontroller 34 scans all the channels available and stores the quality of each channel in the channel map store. The subscriber unit SU when wanting to make an outgoing call selects a physical channel in response to an algorithm held in the control program 40.

Figure 5:
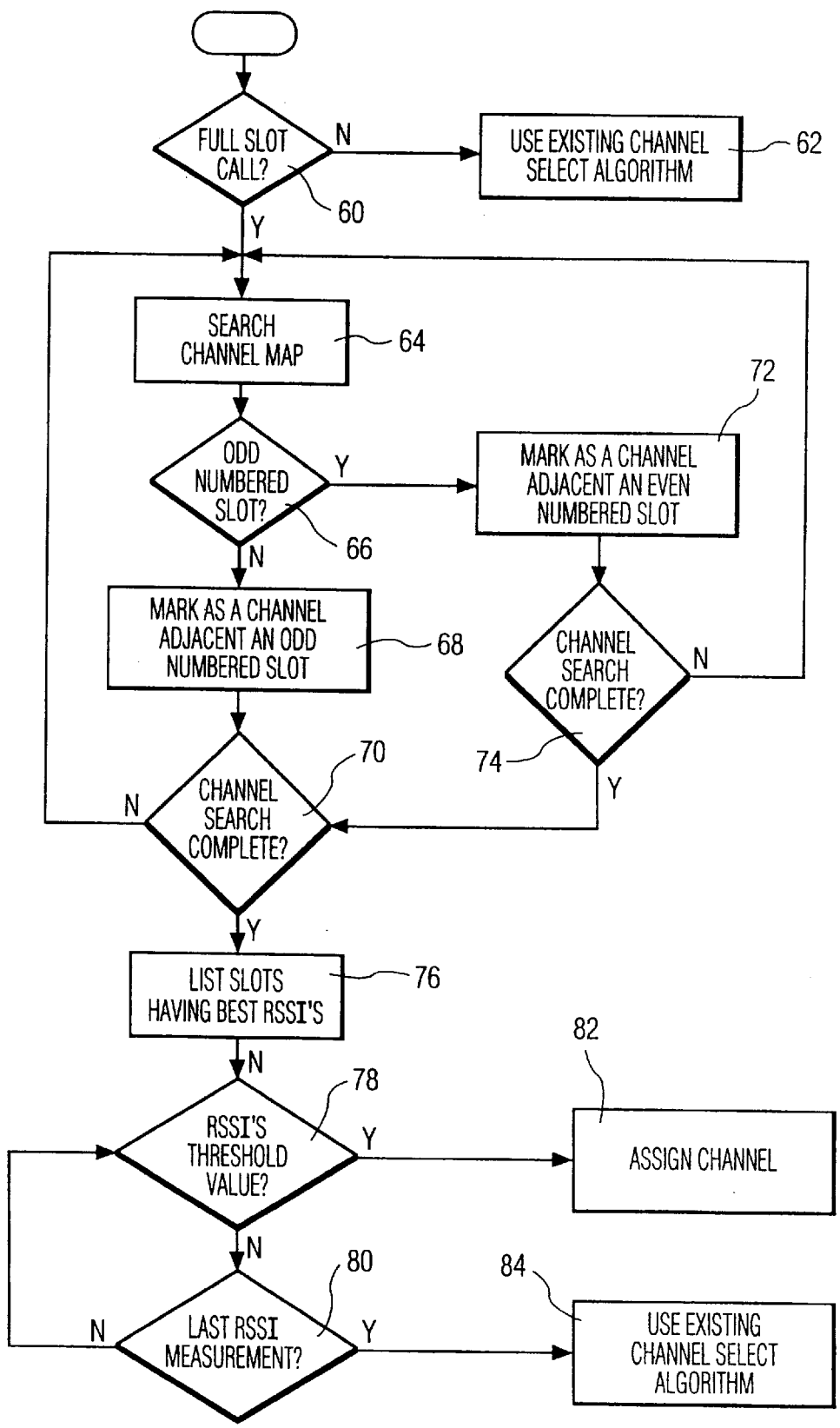

The algorithm is shown in FIG. 5 and commences with block 60 which asks the question "Is the call a full slot call?" If the answer is No (N) then the existing DECT dynamic channel selection algorithm, block 62, is used because the call is either a half slot call or a double slot call. However if the answer is Yes (Y) then in block 64, the channel map is searched. In block 66 the question is asked "Is the slot an odd numbered full slot?" If the answer is No (N), the physical channel in the channel map store is marked as a possible channel next adjacent to an odd numbered full slot, block 68. In block 70 a check is made to see if the search is finished, if the answer is No (N), the algorithm reverts to the block 64.

If the answer to the question in block 66 is Yes (Y) then in block 72 the physical channel is marked as a possible channel next adjacent an even numbered full slot. In block 74 a check is made to see if the search is finished, if the answer is No (N), the algorithm reverts to the block 64.

If the answer to blocks 70 and 74 is Yes (Y), a list of the best RSSI marked slots is made, block 76. Then a check is made to see if the RSSI is greater than an arbitrary threshold value, block 78. If the answer is No (N), then in block 80 a check is made to see if it is the last RSSI and if it is not (N) then the algorithm reverts to the block 78. If the answer to the check made in the block 78 is Yes(Y), then the channel is assigned, block 82. If the answer to the check made in the block 80 is Yes (Y) then the existing DECT channel selection algorithm is applied, block 84.

Figure 6:
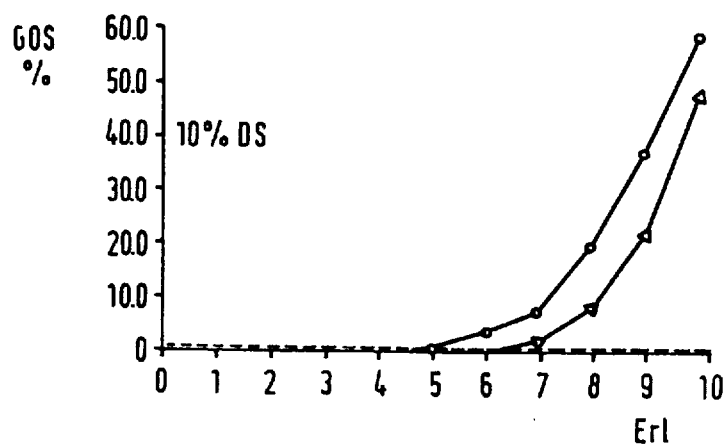
Figure 7:
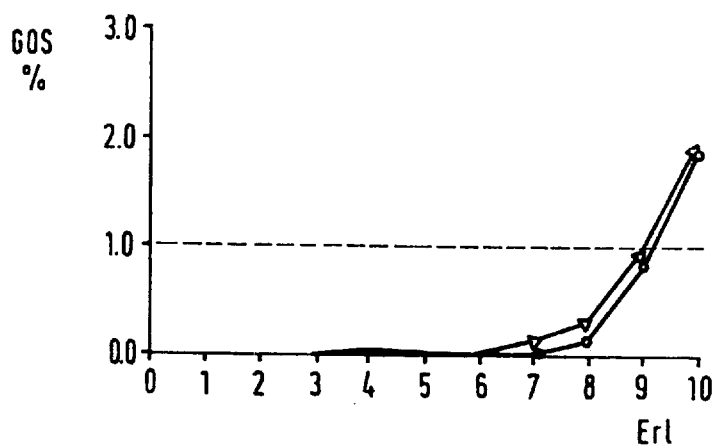
Figure 8:
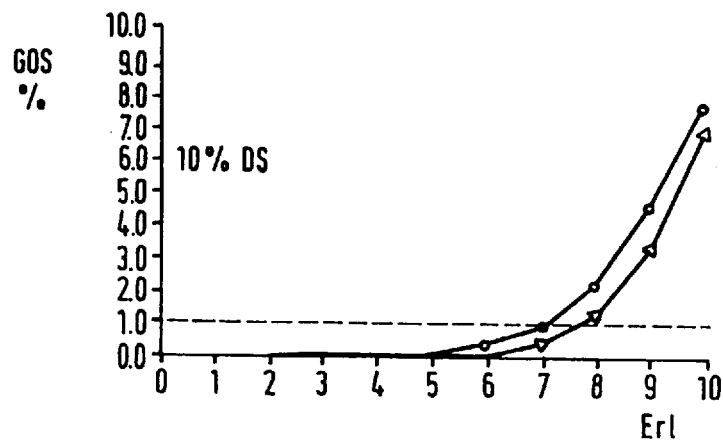

FIGS. 6, 7 and 8 illustrated graphically the results of simulating a mixed slot environment comprising 10% double slot duplex connections, indicated as 10% DS, and 90% full slot connections using the normal DECT slot selection algorithm (circles) and the algorithm described with reference to FIG. 5 (triangles). FIG. 6 considers the double slot grade of service with increasing offered traffic measured in Erlangs (Erl). The new algorithm provides acceptable service to double slot calls (GOS <1%) at an offered traffic level which is nearly 30% greater than for the normal DECT algorithm. FIG. 7 illustrates that the full slot performance is marginally reduced when using the new algorithm. However as shown in FIG. 8 the overall GOS is improved. The marginally worse performance of full slot transmissions is due to the fact that during the set up procedure the slot position selected is not necessarily the best (least interfered) one, but is the best location adjacent to another active full slot in the frame.

From reading the present disclosure, other modifications will be apparent to persons skilled in the art. Such modifications may involve other features which are already known in the design, manufacture and use of cordless telephones and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application of or any further application derived therefrom.

What is claimed is:

1. A time division multiple access (TDMA) communication system in which transmissions are made in duplex voice channels comprising complementary timed slots in a succession or TDMA frames, certain of said transmissions requiring a single full time slot and other of said transmissions requiring a double full time slot consisting of a pair of adjacent single full time slots, the system comprising a plurality of subscriber units, each unit comprising radio transceiving means and control means including means responsive to a request to initiate a call for scanning duplex voice channels; means for determining the quality of at least each inactive time slot and forming a channel map, and maximizing means for maximizing the number of double full time slots, said maximizing means including means for selecting for a single full time slot transmission an inactive single full time slot of an acceptable quality which is located adjacent to an active single full time slot in a TDMA frame.

2. A time division multiple access (TDMA) communication system comprising a plurality of subscriber units, each unit comprising radio transceiving means and control means, the control means including means responsive to a request to initiate a call for scanning duplex voice channels comprising complementary time slots in a TDMA frame; means for determining the quality of at least each inactive time slot and forming a channel map, and selecting means for selecting for a full time slot transmission an inactive full time slot of an acceptable quality which is located adjacent to an active full time slot in the frame, and wherein the time slots in a frame are numbered in an ascending order and said selecting means selects an acceptable higher odd numbered inactive full time slot adjacent an active even numbered full time slot.

3. A subscriber unit for use in a time division multiple access (TDMA) communication system, in which transmissions are made in duplex voice channels comprising complementary time slots in a succession of TDMA frames, certain of said transmissions requiring a single full time slot and other of said transmissions requiring a double full time slot consisting of a pair of adjacent single full time slots the subscriber unit comprising radio transceiving means, control means, means for determining the quality of a TDMA physical channel and a channel map store, wherein the control means in response to a call request for a single full time slot transmission has means for determining which of the inactive physical channels in the channel map store is of an acceptable quality; and means for initiating a transmission in an inactive single full time slot channel of an acceptable quality which is selected to be located adjacent a single full time slot active channel and for maximizing the number ad double full time slots.

4. A subscriber unit for use in a time division multiple access (TDMA) communication system, comprising radio transceiving means, control means, means for determining the quality of a TDMA physical channel and a channel map store, wherein the control means in response to a call request for a full time slot transmission has means for determining which of the inactive physical channels in the channel map store is of an acceptable quality and means for initiating a transmission in an inactive full time slot channel of an acceptable quality located adjacent a full time slot active channel and wherein the full time slots in a TDMA frame are sequentially numbered in ascending order and the control means initiates the transmission in the acceptable higher odd numbered inactive full time slot adjacent an active even numbered full time slot.

* * * * *